Figure 1:
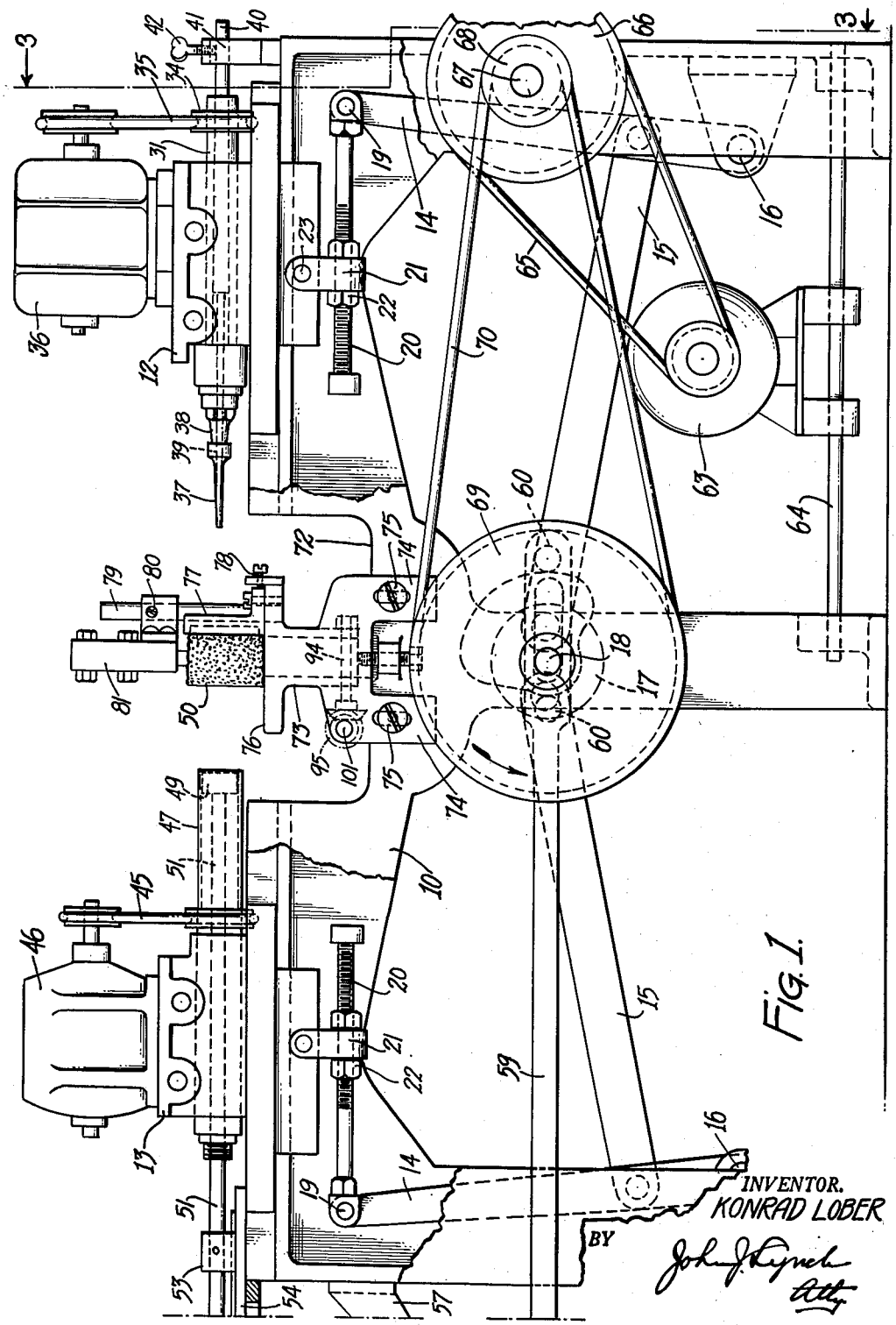

Oct. 28, 1952 K. LOBER 2,615,480
CORK CUTTING MACHINE
Filed July 10, 1947 3 Sheets-Sheet 1

INVENTOR.
KONRAD LOBER
BY

Oct. 28, 1952 K. LOBER 2,615,480
CORK CUTTING MACHINE
Filed July 10, 1947 3 Sheets-Sheet 2
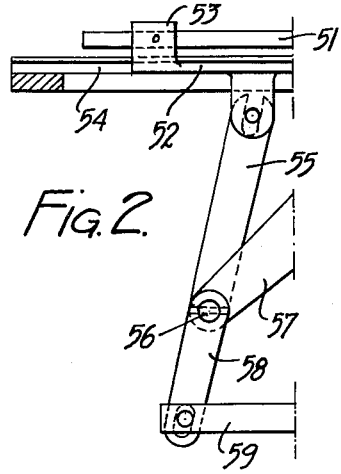
Fig. 2.
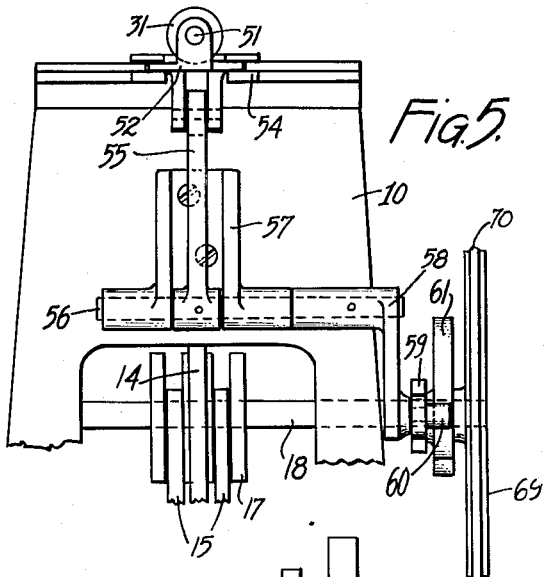
Fig. 5.
Fig. 3.
Fig. 4.
INVENTOR.
KONRAD LOBER
BY John J. Lynch
atty.

Oct. 28, 1952          K. LOBER          2,615,480
CORK CUTTING MACHINE
Filed July 10, 1947          3 Sheets-Sheet 3
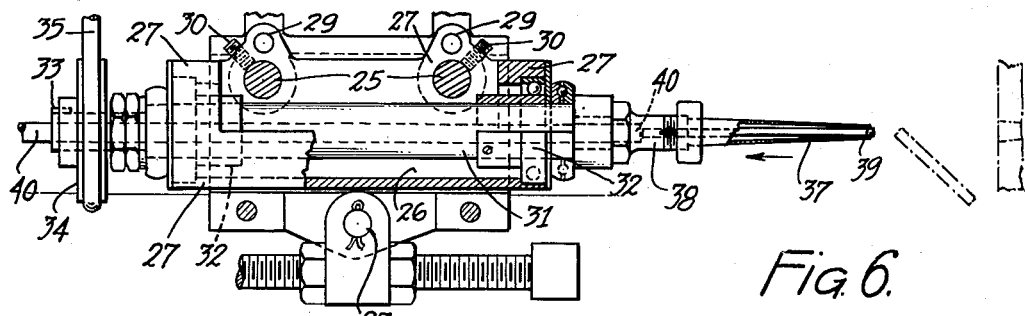
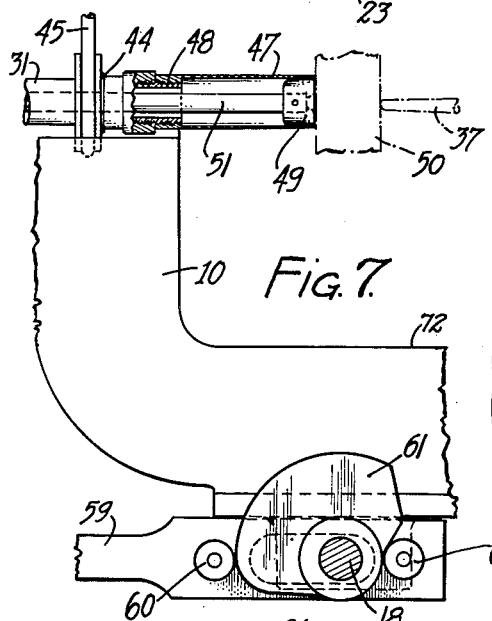
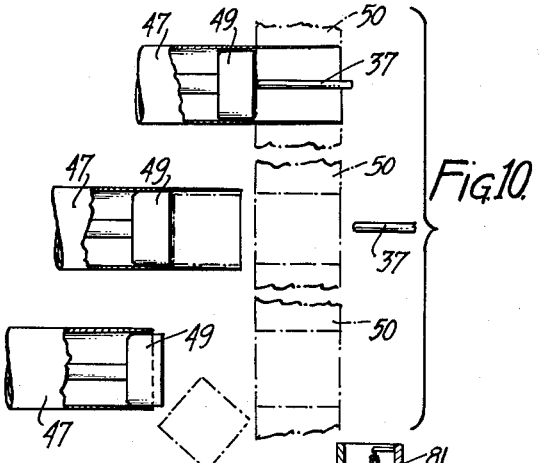
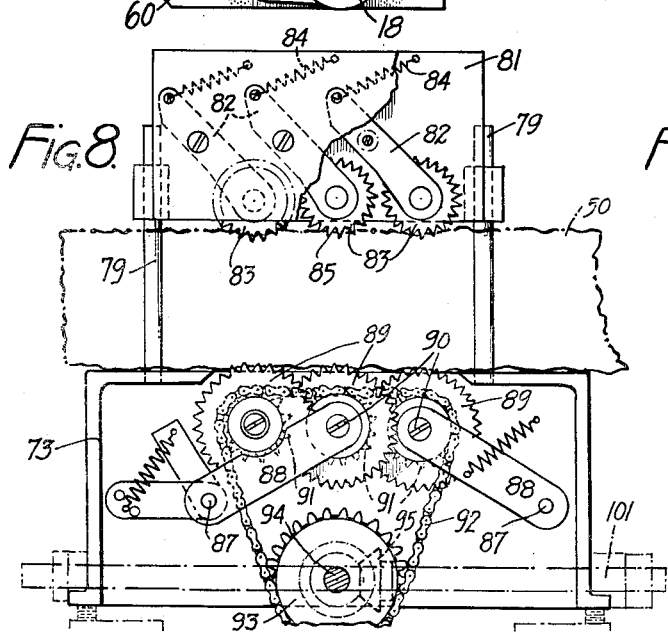
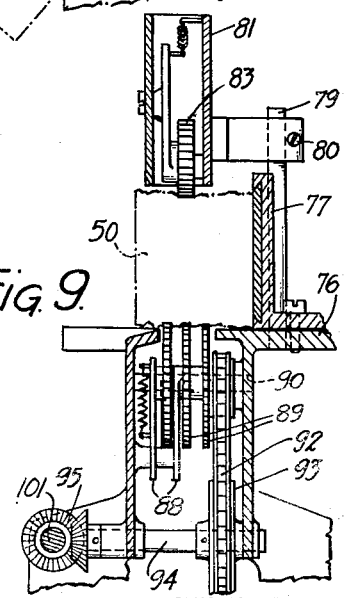
INVENTOR.
KONRAD LOBER
BY John J. Lynch
Atty Patented Oct. 28, 1952

2,615,480

UNITED STATES PATENT OFFICE 2,615,480

CORK CUTTING MACHINE

Konrad Lober, Woodhaven, N. Y.

Application July 10, 1947, Serial No. 760,041

1 Claim. (Cl. 144—2)

This invention relates to cork cutting and piercing machines and in particular to a machine in which two operations occur simultaneously from opposite sides of the bar stock from which the cork forms are cut.

Difficulty has been encountered in cutting from bar stock cork members in shapes which I prefer to call forms in that the high coefficient of friction makes the cutting and piercing of the stock with a clean cut difficult and laborious particularly dry cork and in order to overcome some of the objections to the present machines which do the cutting and piercing in different operations and by the use of separate machines I make use of a single machine which does both operations simultaneously.

It is a particular object of the invention therefore to provide a machine in which bar stock of cork or like material may be fed laterally of the machine for successive positioning of parts thereof to be cut and pierced from opposite sides simultaneously, means being employed for compressing the material adjacent the cutting area so that the stock will cut smoothly and quickly and leave a smooth finish on the form. A further object of the invention is to provide a machine in which the parts are substantially duplicated at opposite ends thereof so that machines can be built at less cost than heretofore and with fewer number of parts in order to accomplish both the cutting and the piercing operations.

A still further object of the invention is to provide a machine having a cutting tube and a piercing tube in opposed relation and a material compressing agent in one of the cutters so that as both cutters operate against each other the cork being cut is densified and rendered easier to cut and punch.

A further object of the invention is to arrange the frame of the machine to provide opposed guide members in which carriages may be simultaneously reciprocated by a single cam means and the movements of the cutters can be coordinated with the movements of the carriages for the purpose of timing the cutting operations.

Still further objects of the invention contemplate the use of push pins and push rods in combination within the cutters so that the forms cut and the cores made by the piercing operations of the cutters may be automatically discharged without the use of further mechanism for this purpose; to provide a novel bar stock feeding mechanism for advancing the cork laterally of the machine so that accurate spacing of the stock will permit the maximum quantity to be cut therefrom, and to provide for adjustment of the carriages in which the cutting means are mounted so that the centers of the cutters and the feeding operation thereof can be varied at will.

With these and other objects in view, the invention comprises certain constructions hereinafter described and then particularly pointed out in the claim and a preferred embodiment of my invention is illustrated in the accompanying drawings in which:

Figure 1 is a view in side elevation of a cork cutting and piercing machine constructed in accordance with my invention, Figure 2 is a continuation of one end of the machine shown in Figure 1, Figure 3 is a section taken substantially on the line 3—3 of Figure 1, Figure 4 is a fragmentary view in side elevation taken at the right of Figure 3 showing the means for feeding the stock, Figure 5 is an end view of the slide and operating means shown in Figure 2, the cam and drive wheel being also included, Figure 6 is a view in side elevation of the cradle at the piercing tool side or end of the machine showing some of the parts in section, Figure 7 is a fragmentary view of the form cutting sleeve or cutter in section and the relative position of a cam used in operating the pressure block used in conjunction with the cutter, Figure 8 is a view taken laterally of the machine at the center thereof showing the feed housings, one of which has the cover plate omitted to show the interior structure, Figure 9 is a view in sectional elevation of the cork bar feed means shown in Figure 8, and Figure 10 is a diagrammatic view showing operational steps in the action of the cutters and automatic discharge of the form and core members.

Referring to the drawings in detail, 10 indicates the frame of a machine having opposite ends substantially alike and shaped to provide guides 11 in which are mounted for sliding movement spindle carriages 12 and 13. The carriage 12 will be referred to as the punch carriage while the carriage 13 will be designated as the cutter carriage. These carriages and the operating parts thereof are sufficiently similar to permit a description of one to suffice for both except for the details of the spindles. Each carriage is arranged to be reciprocated longitudinally of the frame in properly coordinated action with the other by a vertical arm 14 pivoted as at 16 to the frame and actuated by a link 15. The inner end of link 15 is connected to the eccentric 17 mounted on the drive shaft 18 journalled laterally of the frame at the center thereof. The upper end of the arm 14 has pivoted thereto as at 19, an adjusting bolt 20 passing through a shackle 21 secured to the bottom of the carriage. The carriage is adjustable relatively to the bolt 20 by the lock nuts 22 so that the travel position of the carriage can be altered as desired.

The shackle 21 is secured to the carriage by pin 23 (Fig. 3) and the carriage is provided with flanges 24 for sliding engagement with the guides 11. The carriage is substantially U-shaped in cross section and is arranged to support therein, on the laterally extending pins 25, a cradle 26 (Fig. 6) which is formed at its opposite ends to provide bearings 27 and is laterally adjustable relatively to the axial center of the machine by an adjusting screw 28 threaded through one of the mounting ears 29 of said cradle. The cradle is held in any adjusted position by the set screws 30, and is arranged to carry the spindle assembly which consists of a tube 31 passing through ball bearing collars 32 in bearings 27 and keyed at one end as at 33 to a pulley 34 which in turn is driven by a belt 35 operated by a motor 36 mounted on top of the carriage.

In the use of the punch 37 (Fig. 6), which is small in diameter and is hollow and sharpened to pierce the center of the cork to provide a small hole therethrough, the punch is secured to the end of the tube 31 by a chuck 38 which in turn is threaded to a reduced portion of the tube. The punch 37 holds therein a push pin 39 which has free sliding fit and is moved longitudinally by the relative movement between the spindle assembly and a push rod 40 which extends beyond an end of tube 31 and is fixed in a suitable bracket 41 mounted on the frame of the machine. The rod 40 may be adjustably positioned by use of the wing bolt 42, and as the punch cuts through the cork bar a core of cork enters the end of the punch and pushes the pin 39 back against the end of the rod 40. As the punch withdraws, it moves relatively to the pin 39 and rod 40 and the cork core is discharged from the end of the punch.

In order to punch out the cork piece which in this instance is cylindrical in shape, the spindle of the carriage 13 is modified to the extent that (Fig. 7) a threaded end of tube 31 has secured thereto a pulley sleeve 44 so that a belt 45 operated from a motor 46 on the cutter carriage may rotate the cutter 47 which is threaded as at 48 to the end of the tube and houses at its cutting end a pressure block 49 which bears against the cork bar 50. The pressure block is attached to the end of a pressure rod 51 which passes axially through the tube and relatively to which the carriage 13 has longitudinal movement. The rod 51 is reciprocated independently of the reciprocatory movements of the carriage by a slide 52 having ears 53 to which the rod is secured, the slide operating in a channelled bracket 54 secured to and extending beyond the end of the frame 10 as shown in Figure 2.

The slide 52 is actuated by a rock arm 55 secured to a rock shaft 56 in bracket 57, the shaft being oscillated by a rocker 58 a depending portion of which is engaged by the end of a cam link 59. The latter at its opposite end is slotted to fit about the main drive shaft 18 and carries spaced cam rollers 60 which engage the opposite sides of a cam 61 secured to said shaft 18. The action of the cam 61 and the eccentric 17 co- ordinate the relative movements of the cutter 47, as illustrated diagrammatically in Figure 7, and the pressure rod 51 so that the cutter 47 and the pressure foot or block 49 move into engagement with the cork bar with the block exerting pressure on the cork, as cutting takes place, to compress the cork in the area where it is to be cut and punched so that a clean cut is the result. The cutter and block withdraw simultaneously, the block having a small initial movement and after the cutter withdraws sufficiently to space its end from the cork bar, the block stops and the continued withdrawing movement of the cutter discharges the cork form that was removed from the cork bar into a suitable hopper, not shown. The relative movement between the cutter 47 and the foot 49 is instrumental in discharging the cork form from the cutter.

The operation of cam 61 and eccentric 17 with drive shaft 18 is provided by a motor 63 mounted on cross bars 64 in the lower part of frame 10 connected by driving belt 65 with pulley 66 mounted on counter shaft 67 to which is also secured a pulley 68 which drives a pulley 69 on the main shaft 18 through belt 70, in the direction indicated by the arrow (Fig. 1).

The central portion of the frame is cut out as at 72 to provide a rest for a work feeding unit which consists of a feed housing 73 having end apron portions 74 which are adjustably attached to the frame by the bolt-in-a-slot-members 75. The housing 73 presents a table portion 76 on which a guide 77 is adjustably mounted as at 78 to provide an abutment for the cork bar so that it can be compressed by the action of the pressure block 49. The table 76 has vertical posts positioned therein as at 79 to which are adjustably attached as at 80, the ends of a presser housing 81. The latter has journalled between the side walls thereof levers 82 carrying presser wheels 83 which are urged into engagement with the upper surface of the cork bar 50 by springs 84 and bite thereinto by reason of the serrated peripheries 85 of said wheels.

Between the side walls of the feed housing 73 there are supported the cross shafts 87 or studs on which wheel arms 88 are pivoted to carry in their outer ends the feed wheels or disks 89 whose peripheries are serrated. The disks are mounted on studs 90 two of which are carried by the arms 88 and the third carried between the side walls of the housing to support a third feed wheel 89. Each stud has secured thereto a chain sprocket wheel 91 over which passes a sprocket chain 92 which is driven by a main drive sprocket gear 93, mounted on counter shaft 94 journalled in the side walls of the housing 73 and driven by a bevel gear train 95 from main shaft 18, through the medium of an eccentrically actuated ratchet device as seen in Figure 4.

The ratchet device comprises a slotted eccentric plate 96 in which a pivot block 97 is diametrically adjustable by screw 98 so that an eccentric throw arm 99 may be varied in its movements to vary the oscillation of a ratchet arm 100 loosely mounted on ratchet shaft 101 journalled in housing 73 and carrying one of the members of the bevel gear train 95. The throw arm carries a pawl 102 which engages a ratchet wheel secured to said shaft 101, the wheel being indicated as at 103. The operation of the ratchet shaft 101 provides an intermittent feed for the sprocket chain 92 and the feed disks 89 operated thereby to feed the bar of cork crosswise of the frame between the carriages. The operation of the feed disks and the movements of the cutter and punch are timed through operation from a common shaft 18 to obtain the maximum output of the machine, the cork bar 50 being fed between punchings a sufficient distance to obtain the maximum amount of material from the stock.

Various adjustments of the parts may be made to properly locate the work such as by the use of the adjusting bolt 105 located at the portion 72 of the table to adjust the housing 73 vertically.

In the operation of the device, the opposing spindles with their cutters and carriages are advanced toward the opposite sides of the work and cut therefrom concentric cores of material which are removed from the body of the material by the retractile movement of the cutters. As each cutting member retracts, it moves relatively to its respective internal member and expels the piece of material that has been cut from the main bar which is intermittently fed across the table in timed relation with the advance and retract movements of the cutters. The cutters are rotated as they are advanced and retracted for better cutting effect. The cradles that support the cutters or their spindles in the carriages are laterally adjustable for axially aligning the cutters and the relative position of the stroke of each cutter is adjusted by the threaded mounting each carriage has with its own reciprocating means. The relative movement between the cutters and their internal members is provided by mounting one of the members for longitudinal movement independently of the cutter and fixing the other member to the frame, adjustably.

It is evident therefore that I have provided a cork cutter which is equally adaptable to the cutting of dry or wet cork and which, through the use of the simultaneous operation of the cutter and piercing members and the pressure agent will not only reduce the time of production but will turn out a neatly cut and pierced cork member for various uses. It is also evident that by the use of a double ended machine structure of the character set forth, I am enabled to make close adjustments of the parts, adjust the machine for work of different sizes and without the necessity of using auxiliary attachments to assist in adapting the machine to work of varying dimensions.

My invention is not to be restricted to the precise details of construction shown since various changes and modifications may be made therein without departing from the scope of the invention or sacrificing the advantages to be derived from its use.

What I claim is:

The combination, in a machine for cutting forms from a bar of material including a frame having a table extending laterally thereof for supporting the material, means for intermittently feeding the material along the table, a guide on the table and axially aligned carriage guides at opposite sides of the table; of carriages in the guides, means for reciprocating each of the carriages toward and away from the table, a cradle in each carriage, means for adjusting each cradle laterally of its carriage, a spindle assembly in each cradle, said spindle assemblies each mounting a tubular cutter of different diameter propelled by movement of the carriages toward each other to transpierce the material simultaneously from opposite sides and cut therefrom a form having a circular bore, a discharge pin loosely mounted in one of the cutters, a stationary push rod extending with said cutter to prevent retractile movement of the pin to expel a core of material from the cutter when the latter moves away from the table, a pressure rod in the other cutter including a pressure block for squeezing the material against said table guide during the transpiercing operation, a slide to which said pressure rod is secured, means for reciprocating said slide independently of the cutter with which said pressure rod coacts whereby said pressure block expels a core of material from said cutter, and means for rotating said tubular cutters in unison.

KONRAD LOBER.

REFERENCES CITED

The following references are of record in the file of this patent:

UNITED STATES PATENTS

| Number | Name | Date |
| --- | --- | --- |
| 117,952 | Williams | Aug. 8, 1871 |
| 238,082 | Blair | Feb. 22, 1881 |
| 304,724 | Graff | Sept. 9, 1884 |
| 520,605 | Mitchell | May 29, 1894 |
| 669,473 | Blood | Mar. 5, 1901 |
| 1,005,195 | Gold | Oct. 10, 1911 |
| 1,012,320 | Bogdanffy | Dec. 19, 1911 |
| 1,489,825 | Fleming | Apr. 8, 1924 |
| 1,700,400 | Carlson et al. | Jan. 29, 1929 |
| 1,887,434 | Sammis | Nov. 8, 1932 |
| 2,313,814 | Eisler | Mar. 16, 1943 |

FOREIGN PATENTS

| Number | Country | Date |
| --- | --- | --- |
| 587,848 | Germany | Nov. 9, 1933 |